United States Patent
Yeh et al.

(10) Patent No.: US 7,911,717 B2
(45) Date of Patent: Mar. 22, 2011

(54) VEHICULAR HOLDING MODULE CAPABLE OF ZOOMING INFORMATION DISPLAYED ON A SCREEN AND RELATED VEHICULAR ELECTRONIC MODULE

(75) Inventors: Chih-Feng Yeh, Taipei Hsien (TW); Ting-Fu Lee, Taipei Hsien (TW); Chia-Hung Chen, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 0 days.

(21) Appl. No.: 12/478,744

(22) Filed: Jun. 4, 2009

(65) Prior Publication Data

US 2009/0237817 A1  Sep. 24, 2009

Related U.S. Application Data

(62) Division of application No. 11/550,795, filed on Oct. 18, 2006, now abandoned.

(30) Foreign Application Priority Data

Jul. 28, 2006 (TW) .............................. 95213333 U

(51) Int. Cl.
*G02B 27/02* (2006.01)
(52) U.S. Cl. ........................................ 359/802; 359/804
(58) Field of Classification Search .................. 359/802, 359/803, 804, 809, 815
See application file for complete search history.

(56) References Cited

U.S. PATENT DOCUMENTS

| | | |
|---|---|---|
| 3,851,536 A | 12/1974 | Zeldman |
| 6,418,010 B1 | 7/2002 | Sawyer |
| 6,757,551 B2 | 6/2004 | Newman |
| 7,065,381 B2 | 6/2006 | Jenkins |
| 2006/0171045 A1 | 8/2006 | Carnevali |
| 2006/0290654 A1 | 12/2006 | Wang |
| 2007/0035853 A1* | 2/2007 | Bendror et al. ............... 359/802 |

* cited by examiner

*Primary Examiner* — Alicia M Harrington
(74) *Attorney, Agent, or Firm* — Winston Hsu; Scott Margo

(57) ABSTRACT

A vehicular holding module includes a frame for holding an electronic device, and a display device. The electronic device has a screen. The display device is disposed at a side of the frame for zooming information displayed on the screen.

24 Claims, 4 Drawing Sheets

VEHICULAR HOLDING MODULE CAPABLE OF ZOOMING INFORMATION DISPLAYED ON A SCREEN AND RELATED VEHICULAR ELECTRONIC MODULE

CROSS REFERENCE TO RELATED APPLICATIONS

This application is a division of application Ser. No. 11/550,795 filed on Oct. 18, 2006, and the entire contents of which are hereby incorporated by reference.

BACKGROUND OF THE INVENTION

1. Field of the Invention

The present invention relates to a vehicular holding module and related vehicular electronic modules, and more specifically, to a vehicular holding module capable of zooming information displayed on a screen and related vehicular electronic modules.

2. Description of the Prior Art

With the improvement of wireless communication and electronic technology, cellular phones have become indispensable communication products in daily life. Along with the all-in-one trend, users would like to be able to choose a multi-function cellular phone. Therefore, there are more and more additional functions installed in cellular phones, such as GPS (Global Positioning System).

A GPS cellular phone is more portable and cheaper than an automobile GPS, so a user may want to use the GPS cellular phone to replace the automobile GPS. However, when the user uses the GPS cellular phone to look up roadway information while driving, the user cannot see information displayed on the screen of the GPS cellular phone clearly because of the not-big-enough screen size (about 2.5-2.8 inches). In such a manner, the use of the GPS cellular phone is not only constrained by the small screen size but also inconvenient for the user.

SUMMARY OF THE INVENTION

The present invention discloses a vehicular holding module comprising a frame for holding an electronic device having a screen; and a display device disposed at a side of the frame, for zooming information displayed on the screen.

The present invention further discloses a vehicular electronic module comprising an electronic device having a screen; a frame for holding the electronic device; and a display device disposed at a side of the frame, for zooming information displayed on the screen.

The present invention further discloses a vehicular electronic module comprising an electronic device having a screen; a frame for holding the electronic device; a display device disposed at a side of the frame, for zooming information displayed on the screen; and a connection mechanism connected to the display device and the frame, for supporting the display device at the side of the frame, the connection mechanism comprising a cantilever board having a groove structure; and a slide device connected to the display device and disposed movably inside the groove structure, for adjusting a distance between the display device and the screen of the electronic device, the slide device comprising a telescopic structure fixed telescopically to the groove structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
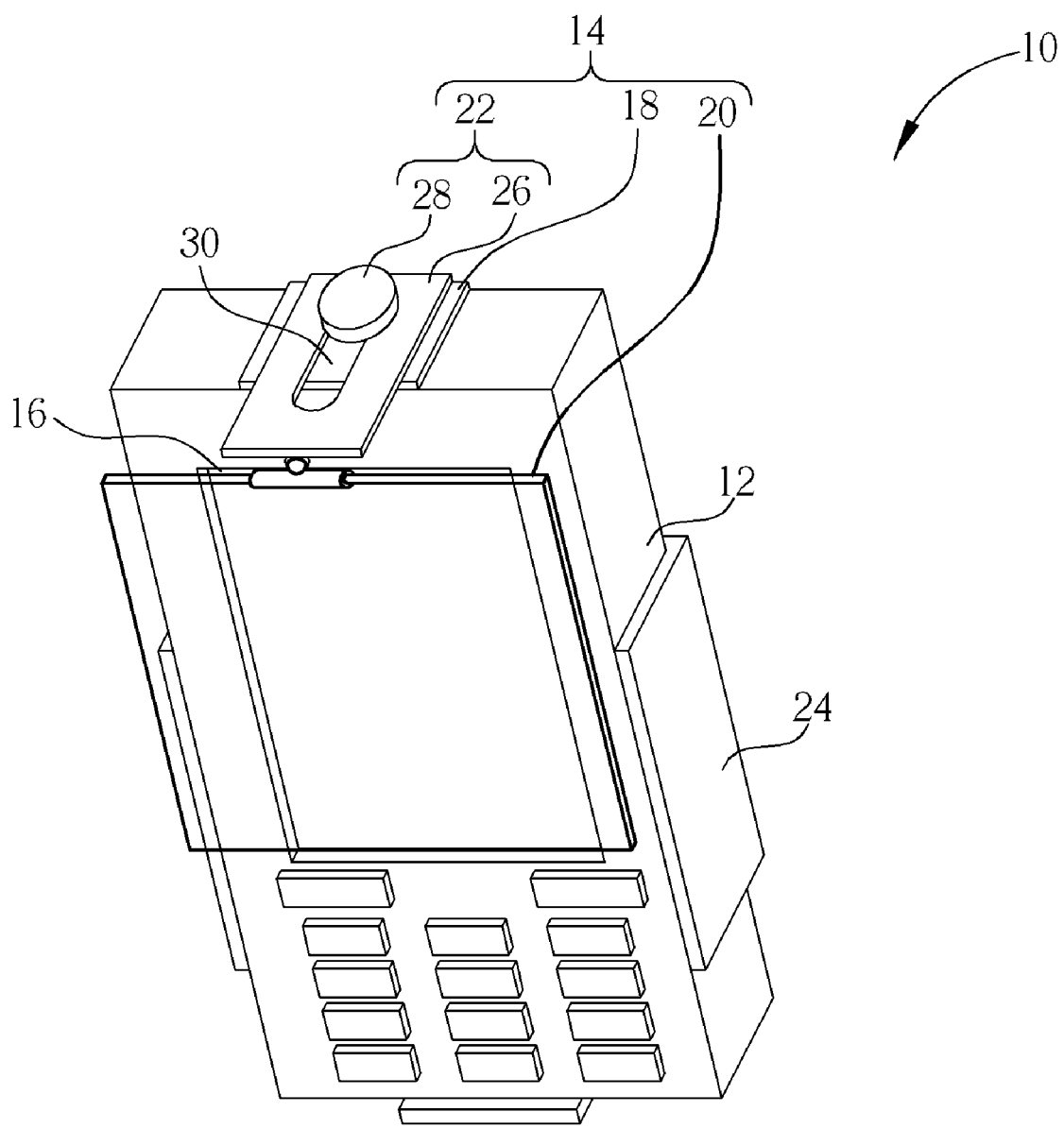
FIG. 1 is a diagram of a vehicular electronic module according a first embodiment of the present invention.

Please refer to FIG. 1. FIG. 1 is a diagram of a vehicular electronic module 10 according a first embodiment of the present invention. The vehicular electronic module 10 comprises an electronic device 12 and a vehicular holding module 14. The electronic device 12 is disposed inside the vehicular holding module 14. The electronic device 12 has a screen 16. The vehicular holding module 14 comprises a frame 18, a display device 20, and a connection mechanism 22. The frame 18 is used for holding the electronic device 12. The frame 18 has a telescopic part 24. The telescopic part 24 is used for adjusting a holding area of the frame 18. The display device 20 is disposed at a side of the frame 18. The display device 20 is used for zooming information displayed on the screen 16. The display device 20 can be a magnifying device, such as a magnifying glass. The connection mechanism 22 is connected to the frame 18 and the display device 20, for supporting the display device 20 at the side of the frame 18. The connection mechanism 22 comprises a cantilever board 26 and a fixed part 28. An end of the cantilever board 26 is connected to the display device 20, and the other end is connected to the frame 18. The cantilever board 26 has a chute 30. The fixed part 28 can be a screw. The fixed part 28 is disposed inside the chute 30, for fixing a position of the frame 18 relative to the cantilever board 26. A combination of the fixed 28 and the chute 30 can be used for adjusting a position of the cantilever board 26. That is to say, when a user releases the fixed part 28, the user can move the cantilever board 26 relative to the fixed part 28 forward or backward along the chute 30. When the position of the cantilever board 26 is adjusted to where the user can see information displayed on the screen 16 clearly through the display device 20, the user can use the fixed part 28 to fix the combination of the frame 18 and the cantilever board 26. For example, if the display device 20 is a magnifying glass, a distance that the user can see information displayed on the screen 16 clearly through the display device 20 is the focal length of the magnifying glass. When the user moves the display device 20 to the focal point of the screen 16, the user can use the fixed part 28 to fix the combination of the frame 18 and the cantilever board 26 so that a distance between the screen 16 and the display device 20 can be fixed to the focal length of the magnifying glass. In such a manner, information on the screen 16 will be displayed clearly. Furthermore, the display device 20 is pivotally connected to a side of the cantilever board 26. Therefore, the user can rotate the display device 20 arbitrarily to move the display device 20 aside when the user wants to operate the electronic device 18. For example, the user can rotate the electronic device 20 horizontally or vertically to move the display device 20 aside. The electronic device 12 can be a vehicular GPS (global positioning system) device, such as a mobile GPS device or a wireless communication device. The electronic device 12 also can be a GPS mobile phone for looking up roadway information.

Furthermore, the frame 18 is not limited to having a single telescopic part 24. For example, if the size of the electronic device 12 does not match the size of the holding area of the frame 18, the user can adjust telescopic parts respectively disposed at four sides of the frame 18 to make the holding area of the frame 18 fit the size of the electronic device 12. In such a manner, the holding area of the frame 18 can be suitable for different sized electronic devices.

Figure 2:
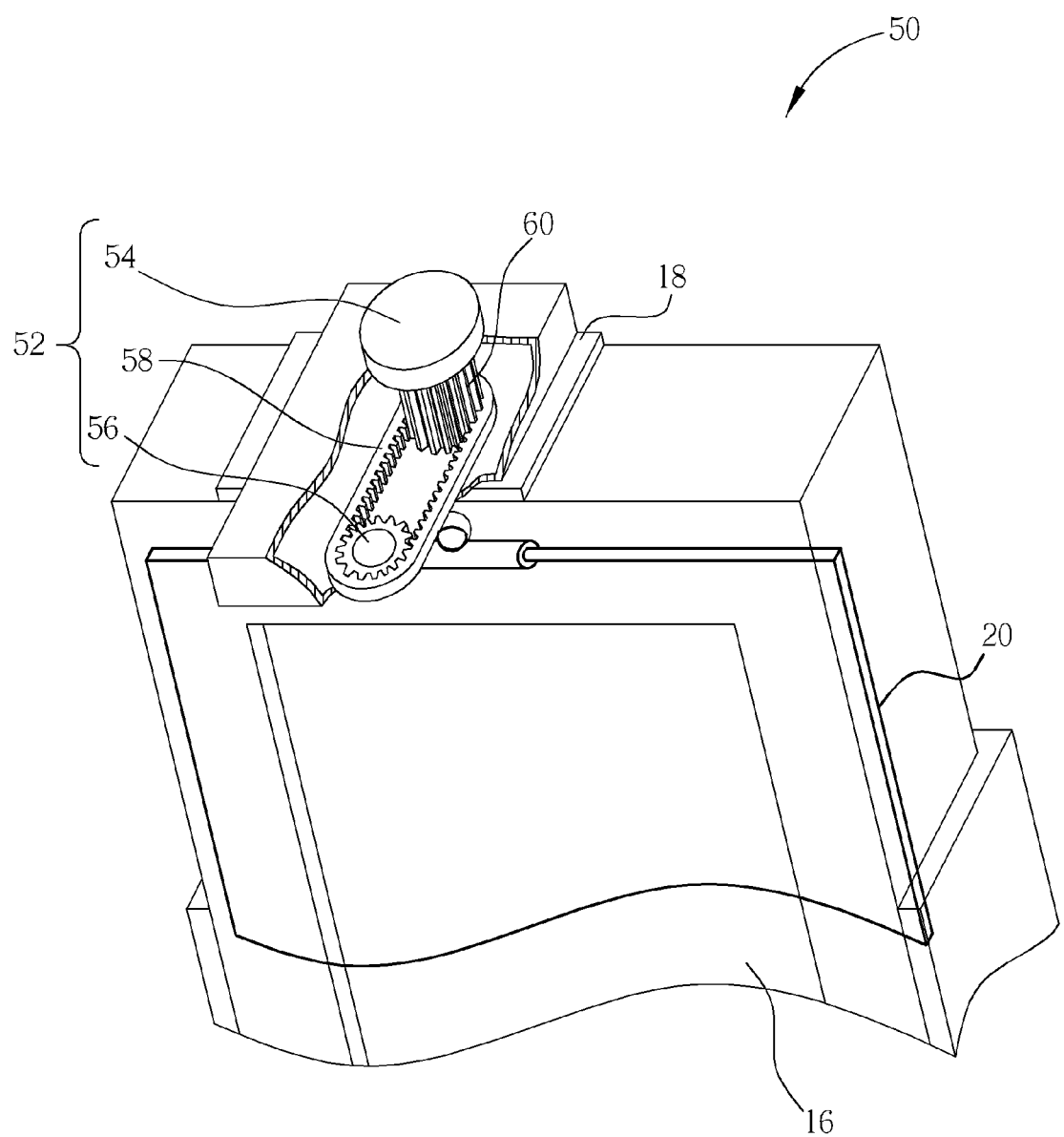
FIG. 2 is a diagram of a vehicular holding module according to a second embodiment of the present invention.

Please refer to FIG. 2. FIG. 2 is a diagram of a vehicular holding module 50 according to a second embodiment of the present invention. Components mentioned in both the first embodiment and the second embodiment represent components with similar functions or similar positions. The vehicular holding module 50 comprises a frame 18, a display device 20, and a connection mechanism 52. The connection mechanism 52 comprises a fixed part 54, a gear 56, and a transmission part 58. The transmission part 58 can be a tooth belt. The fixed part 54 is fixed to the frame 18. The fixed part 54 has a tooth structure 60. The transmission part 58 is meshed with the gear 56 and the tooth structure 60 of the fixed part 54. The display device 20 is pivotally connected to the transmission part 58. That is to say, the user can rotate the electronic device 20 horizontally or vertically to move the display device 20 aside. The user can use the transmission part 58 to drive the display device 20 moving forward or backward relative to the frame 18. In other words, when the user wants to adjust the distance between the screen 16 and the display device 20, the user can move the display device 20 through the transmission of the transmission part 58, the gear 56 and the tooth structure 60. And when the position of the display device 20 is adjusted to where the user can see information displayed on the screen 16 clearly through the display device 20, the user can fix the distance between the screen 16 and the display device 20 through the engagement of the transmission part 58 and the gear 56 and the engagement of the transmission part 58 and the tooth structure 60.

Figure 3:
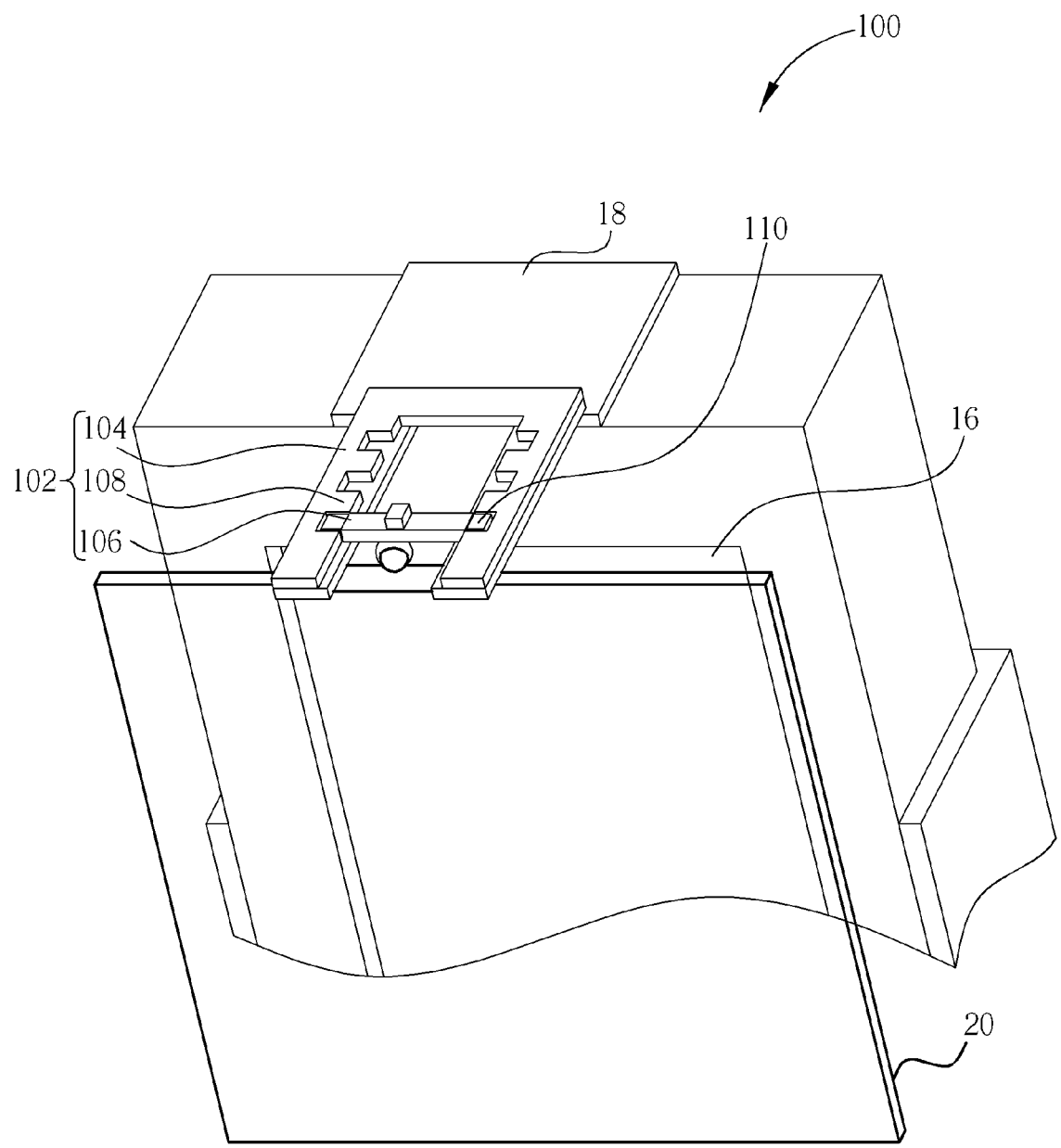
FIG. 3 is a diagram of a vehicular holding module according to a third embodiment of the present invention.

Please refer to FIG. 3. FIG. 3 is a diagram of a vehicular holding module 100 according to a third embodiment of the present invention. Components mentioned in both the first embodiment and the third embodiment represent components with similar functions or similar positions. The vehicular holding module 100 comprises a frame 18, a display device 20, and a connection mechanism 102. The connection mechanism 102 comprises a cantilever board 104 and a slide device 106. The cantilever board 104 has a groove structure 108. The slide device 106 is disposed movably inside the groove structure 108, and the display device 20 is pivotally connected to the slide device 106. That is to say, the user can adjust the distance between the display device 20 and the screen 16 by moving the slide device 106. The slide device 106 comprises a telescopic structure 110 fixed telescopically to the groove structure 108.

Figure 4:
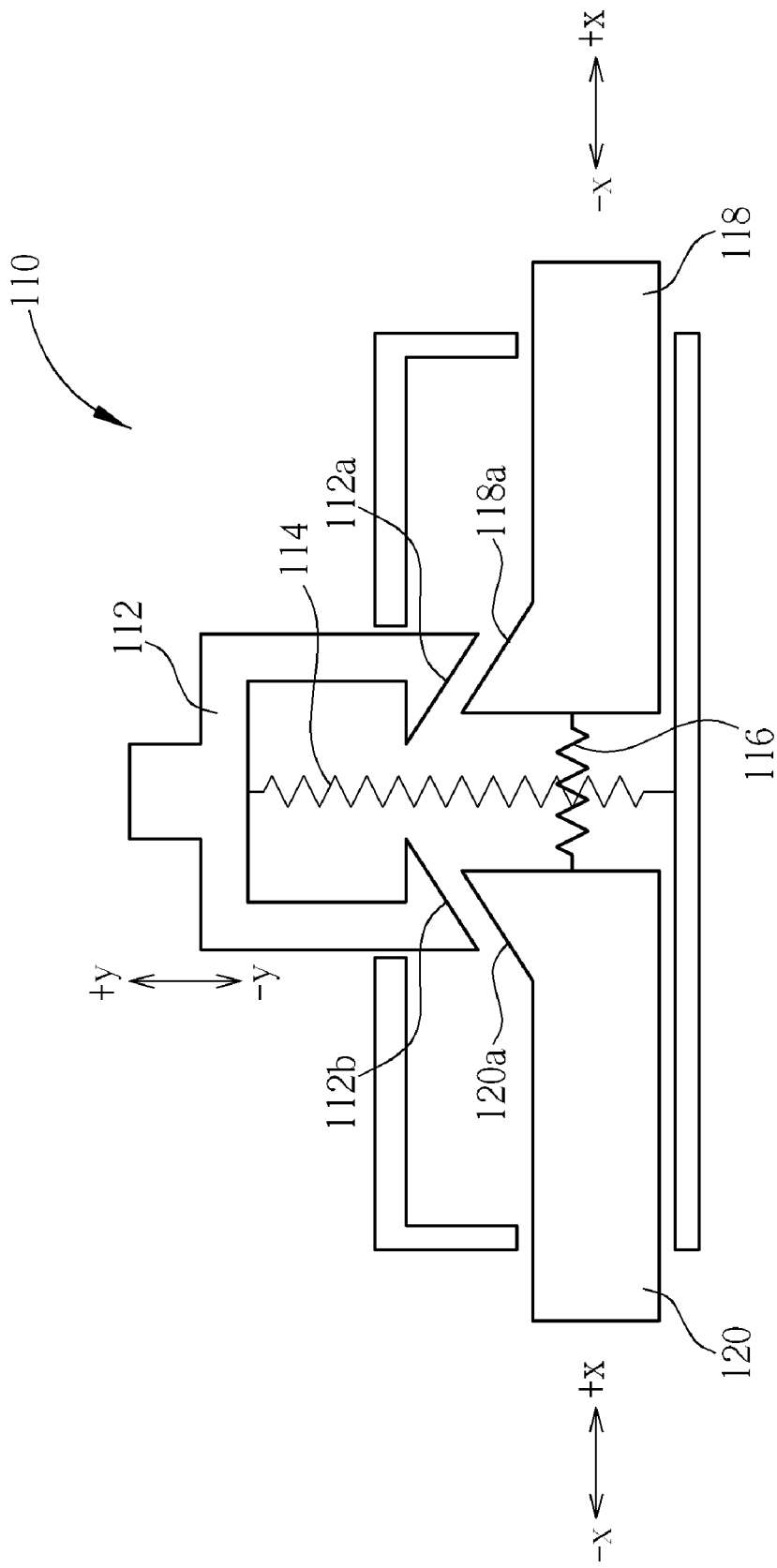
FIG. 4 is a sectional diagram of the telescopic structure in FIG. 3.

Please refer to FIG. 4. FIG. 4 is a sectional diagram of the telescopic structure 110 in FIG. 3. The telescopic structure 110 comprises a press part 112 having a first incline 112a and a third incline 112b, a first elastic part 114, a second elastic part 116, a first slide part 118 having a second incline 118a, and a second slide part 120 having a fourth incline 120a. The first elastic part 114 is connected to the press part 112. The second elastic part 116 is connected to the first slide part 118 and the second slide part 120.

Please continue to refer to FIG. 4. The relative slide between the first incline 112a and the second incline 118a and the relative slide between the third incline 112b and the fourth incline 120a are utilized to change the length of the telescopic structure 110. That is to say, when the user wants to move the display device 20, the user can exert a force on the press part 112 to let the press part 112 move along the −y direction shown in FIG. 4. Then, the first incline 112a slides relative to the second incline 118a so that the first slide part 118 can move along the −x direction shown in FIG. 4. Meanwhile, the third incline 112b also slides relative to the fourth incline 120a so that the second slide part 120 can move along the +x direction shown in FIG. 4. In such a manner, the length of the telescopic structure 110 in the x direction can be shortened so that the slide device 106 can be movable inside the groove structure 108. Furthermore, when the user has moved the location of the slide device 106 from the original position to another position, the user can stop exerting the force on the press part 112. Then, the press part 112 moves along the +y direction shown in FIG. 4 because of the elasticity of the first elastic part 114 so that the location of the press part 112 can go back to the original location. At the same time, the first slide part 118 and the second slide part 120 also moves along the +x and −x direction shown in FIG. 4 respectively because of the elasticity of the second elastic part 116 so that the length of the telescopic structure 110 in the x direction can go back to the original length. Therefore, the telescopic structure 110 can be engaged with the groove structure 108 again. In other words, when the position of the display device 20 is adjusted to where the user can see information displayed on the screen 16 clearly through the display device 20, the user can use the telescopic structure 110 to fix the distance between the screen 16 and the display device 20.

Furthermore, the connection mechanism of the present invention can also not have the function of adjusting the distance between the display device and the frame. That is to say, the distance between the display device and the frame can be fixed to the focal distance of the display device.

A combination of a display device and a frame is utilized to zoom information displayed on a screen of an electronic device disposed at the frame according to the present invention. In such a manner, the user can see information displayed on the screen clearly through the display device. When applied to a GPS cellular phone, the display device can be a magnifying glass. Therefore, the user can see roadway information displayed on the screen of the GPS cellular phone clearly through the magnifying glass.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vehicular holding module comprising:
   a frame for holding an electronic device having a screen;
   a display device disposed at a side of the frame, for zooming information displayed on the screen; and
   a connection mechanism connected to the display device and the frame, for supporting the display device at the side of the frame, the connection mechanism comprising:
      a cantilever board having a groove structure, the groove structure comprising a plurality of grooves; and
      a slide device connected to the display device and disposed movably inside the groove structure, for selectively engaging with one of the plurality of grooves to adjust a distance between the display device and the screen.

2. The vehicular holding module of claim 1, wherein the display device is pivotally connected to the slide device.

3. The vehicular holding module of claim 1, wherein the slide device comprises a telescopic structure fixed telescopically to the groove structure.

4. The vehicular holding module of claim 3, wherein the telescopic structure comprises:
   a press part having a first incline;
   a first elastic part connected to the press part;
   a first slide part having a second incline, for moving relatively with the press part via relative slide between the first incline and the second incline; and
   a second elastic part connected to the first slide part.

5. The vehicular holding module of claim 4, wherein the press part further has a third incline, and the telescopic structure further comprises a second slide part having a fourth incline for moving relatively with the press part via relative slide between the third incline and the fourth incline wherein the second elastic part is connected to the first slide part and the second slide part.

6. The vehicular holding module of claim 1, wherein the display device is a magnifying glass.

7. The vehicular holding module of claim 1, wherein the frame has a telescopic part for adjusting a holding area of the frame.

8. A vehicular electronic module comprising:
an electronic device having a screen;
a frame for holding the electronic device;
a display device disposed at a side of the frame, for zooming information displayed on the screen; and
a connection mechanism connected to the display device and the frame, for supporting the display device at the side of the frame, the connection mechanism comprising:
  a cantilever board having a groove structure, the groove structure comprising a plurality of grooves; and
  a slide device connected to the display device and disposed movably inside the groove structure, for selectively engaging with one of the plurality of grooves to adjust a distance between the display device and the screen.

9. The vehicular electronic module of claim 8, wherein the display device is pivotally connected to the slide device.

10. The vehicular electronic module of claim 8, wherein the slide device comprises a telescopic structure fixed telescopically to the groove structure.

11. The vehicular electronic module of claim 10, wherein the telescopic structure comprises:
a press part having a first incline;
a first elastic part connected to the press part;
a first slide part having a second incline, for moving relatively with the press part via relative slide between the first incline and the second incline; and
a second elastic part connected to the first slide part.

12. The vehicular electronic module of claim 11, wherein the press part further has a third incline, and the telescopic structure further comprises a second slide part having a fourth incline for moving relatively with the press part via relative slide between the third incline and the fourth incline wherein the second elastic part is connected to the first slide part and the second slide part.

13. The vehicular electronic module of claim 8, wherein the display device is a magnifying glass.

14. The vehicular electronic module of claim 8, wherein the frame has a telescopic part for adjusting a holding area of the frame.

15. A vehicular holding module comprising:
a frame for holding an electronic device having a screen;
a display device disposed at a side of the frame, for zooming information displayed on the screen; and
a connection mechanism connected to the display device and the frame, for supporting the display device at the side of the frame, the connection mechanism comprising:
  a cantilever board having a groove structure; and
  a slide device connected to the display device and disposed movably inside the groove structure, for adjusting a distance between the display device and the screen, the slide device comprising a telescopic structure fixed telescopically to the groove structure, the telescopic structure comprising:
    a press part having a first incline;
    a first elastic part connected to the press part;
    a first slide part having a second incline, for moving relatively with the press part via relative slide between the first incline and the second incline; and
    a second elastic part connected to the first slide part.

16. The vehicular holding module of claim 15, wherein the display device is pivotally connected to the slide device.

17. The vehicular holding module of claim 15, wherein the press part further has a third incline, and the telescopic structure further comprises a second slide part having a fourth incline for moving relatively with the press part via relative slide between the third incline and the fourth incline wherein the second elastic part is connected to the first slide part and the second slide part.

18. The vehicular holding module of claim 15, wherein the display device is a magnifying glass.

19. The vehicular holding module of claim 15, wherein the frame has a telescopic part for adjusting a holding area of the frame.

20. A vehicular electronic module comprising:
an electronic device having a screen;
a frame for holding the electronic device;
a display device disposed at a side of the frame, for zooming information displayed on the screen; and
a connection mechanism connected to the display device and the frame, for supporting the display device at the side of the frame, the connection mechanism comprising:
  a cantilever board having a groove structure; and
  a slide device connected to the display device and disposed movably inside the groove structure, for adjusting a distance between the display device and the screen, the slide device comprising a telescopic structure fixed telescopically to the groove structure, the telescopic structure comprising:
    a press part having a first incline;
    a first elastic part connected to the press part;
    a first slide part having a second incline, for moving relatively with the press part via relative slide between the first incline and the second incline; and
    a second elastic part connected to the first slide part.

21. The vehicular electronic module of claim 20, wherein the display device is pivotally connected to the slide device.

22. The vehicular electronic module of claim 20, wherein the press part further has a third incline, and the telescopic structure further comprises a second slide part having a fourth incline for moving relatively with the press part via relative slide between the third incline and the fourth incline wherein the second elastic part is connected to the first slide part and the second slide part.

23. The vehicular electronic module of claim 20, wherein the display device is a magnifying glass.

24. The vehicular electronic module of claim 20, wherein the frame has a telescopic part for adjusting a holding area of the frame.

\* \* \* \* \*